United States Patent [19]

Yamada et al.

[11] Patent Number: 5,514,466
[45] Date of Patent: May 7, 1996

[54] PLASTIC OPTICAL ARTICLES

[75] Inventors: Shinichi Yamada; Naoki Shimoyama, both of Otsu; Takashi Taniguchi, Yasu; Syunzi Kono, Otsu, all of Japan

[73] Assignee: Toray Industries, Inc., Japan

[21] Appl. No.: 268,676

[22] Filed: Jun. 30, 1994

Related U.S. Application Data

[63] Continuation of Ser. No. 835,122, Feb. 12, 1992, abandoned.

[30] Foreign Application Priority Data

Feb. 15, 1991 [JP] Japan .................. 3-022107
Feb. 15, 1991 [JP] Japan .................. 3-022108
Feb. 27, 1991 [JP] Japan .................. 3-032725

[51] Int. Cl.$^6$ ........................ B32B 5/16
[52] U.S. Cl. .............. 428/328; 428/1; 428/329; 428/332; 428/337; 428/447; 428/451; 428/473.5; 428/702
[58] Field of Search .................... 428/328, 329, 428/337, 332, 447, 451, 702, 473.5, 1; 359/36, 62

[56] References Cited

U.S. PATENT DOCUMENTS

| | | | |
|---|---|---|---|
| 4,065,600 | 12/1977 | King et al. | 428/702 |
| 4,177,315 | 12/1979 | Ubersax | 428/451 |
| 4,188,451 | 2/1980 | Humphrey, Jr. | 428/451 |
| 4,235,954 | 11/1980 | Humphrey, Jr. | 428/451 |
| 4,239,798 | 12/1980 | Schroeter et al. | 428/451 |
| 4,311,763 | 1/1982 | Conroy | 428/451 |
| 4,324,839 | 4/1982 | Frye | 428/451 |
| 4,367,262 | 1/1983 | Vaughn, Jr. | 428/451 |
| 4,368,236 | 1/1983 | Frye | 428/451 |
| 4,382,109 | 5/1983 | Olson et al. | 428/451 |
| 4,417,790 | 11/1983 | Dawson et al. | 428/451 |
| 4,442,168 | 4/1984 | White et al. | 428/451 |
| 4,474,857 | 10/1984 | Vaughn, Jr. | 428/451 |
| 4,477,519 | 10/1984 | Frye | 428/451 |
| 4,477,528 | 10/1984 | Frye | 428/451 |
| 4,585,689 | 4/1986 | Ohta et al. | 428/702 |
| 4,599,272 | 7/1986 | Ichikawa | 428/412 |
| 4,895,767 | 1/1990 | Mori et al. | 428/702 |
| 4,956,227 | 9/1990 | Hirayama | 428/328 |
| 5,015,523 | 5/1991 | Kawashima et al. | 428/336 |
| 5,045,235 | 9/1991 | Ohara et al. | 428/702 |

FOREIGN PATENT DOCUMENTS

| | | |
|---|---|---|
| 0174373 | 3/1986 | European Pat. Off. . |
| 0195493 | 9/1986 | European Pat. Off. . |
| 0282019 | 9/1988 | European Pat. Off. . |
| 0404111 | 12/1990 | European Pat. Off. . |
| 2276360 | 1/1976 | France . |
| 2663036 | 12/1991 | France . |
| 59-38262 | 3/1984 | Japan . |

*Primary Examiner*—D. S. Nakarani
*Attorney, Agent, or Firm*—Austin R. Miller

[57] ABSTRACT

A plastic optical article wherein a transparent coating film is applied on a transparent three-dimensional cross-linked resin having a glass transition temperature of at least 130° C. The article has excellent heat resistance, solvent resistance, chemical resistance, abrasion resistance and transparency, and is used as optical materials for optical lenses and substrate materials for various display devices. Also when an inorganic thin film is deposited on a surface such as a transparent electro-conductive film, a thin film having a high heat resistance can be obtained.

19 Claims, No Drawings

PLASTIC OPTICAL ARTICLES

This application is a continuation of application Ser. No. 07/835,122, filed Feb. 12, 1992, now abandoned.

BACKGROUND OF THE INVENTION

1. Field of the Invention

This invention relates to plastic optical articles having excellent properties such as heat resistance, abrasion resistance, transparency, and solvent resistance.

2. Description of the Related Art

Plastic materials in general are light in weight and have excellent impact resistance, processability, and mass-producibility, and therefore, the demand for the plastic materials for optical devices such as an optical filter, an optical lens and an optical disk has increased. Transparent resins such as poly(methyl methacrylate), polystyrene and polycarbonate are mainly used at present as the plastic material for these optical devices, but these materials have problems in that the thermoplastic resins not only have low heat resistance, as typified by a thermal deformation temperature, but also have low solvent resistance and a low elastic modulus.

In addition to the problems described above, the plastic optical devices have lower surface hardness than inorganic glass, and many attempts have been made to solve this problem. For example, there has been proposed a method by which an inorganic material such as $SiO_2$ is deposited on the surface of a plastic substrate by vacuum deposition (Japanese Unexamined Patent Publication No. 58-204031), and a method by which a polyorganosilane type hard coat film or an acrylic type hard coat film is coated on the surface of the plastic substrate (U.S. Pat. Nos. 3,986,997 and 4,211,823 and Kokai (Japanese Unexamined Patent Publication Nos. 57-168922, 59-38262, 59-51908, 59-51954, 59-78240, 59-89368, 59-102964, 59- 109528, 59-120663, 59-155437, 59-174629, 59-193969, 59- 204669), and so forth.

The improvement of the surface hardness by vacuum deposition of the inorganic material such as $SiO_2$, according to the prior art, can provide high hardness, but leads to critical problems such as lowered adhesion to the substrate, and lower heat resistance and light resistance. The technique described in Japanese Unexamined Patent Publication Nos. 59-38262, 59-51908, etc., by which a silane type and acrylic type hard coat film is coated, can improve the heat resistance to some extent, but the effect thereof is still unsatisfactory.

SUMMARY OF THE INVENTION

The object of the present invention is to solve the problems described above, and provide a plastic optical article having excellent properties such as heat resistance, abrasion resistance, transparency, and solvent resistance.

To accomplish the object described above, the present invention employs the construction described below.

A plastic optical article is provided wherein a transparent coating is applied to a surface of a transparent cross-linked resin having a glass transition temperature of at least 130° C.

As long as the transparent thermosetting cross-linked resins used herein have a glass transition temperature of at least 130° C., any resins can be used without limitation. In particular, as the transparent thermosetting resin in the present invention, resins having a glass transition temperature of 160° C. or more are more preferable because the heat resistance can be further improved. The term "glass transition temperature" as used herein means the temperature at which a polymer changes from an amorphous glassy state to a rubbery state, and in the transition region, various properties such as an elastic modulus, an expansion coefficient, a heat content, a refractive index, a dielectric constant, and so forth, are changed. The glass transition temperature can be measured from the change of these properties, but more definitely, this can be evaluated by a known method (e.g., JIS K7121) by using a differential scanning calorimetry (DSC), etc. When measuring the glass transition temperature by the differential scanning calorimetry, the glass transition temperature can be determined by evaluating the transparent thermosetting resin itself, or a heat-treated product thereof. When the transparent coating is sufficiently thin, however, the glass transition temperature of the article provided with the transparent coating on the transparent thermosetting resin can be regarded as the glass transition temperature of the transparent thermosetting resin.

When expressed by a bending modulus (a modulus of elasticity in bending) as an index of the mechanical property of the transparent cross-linked resin, it is preferably at least 200 $kg/mm^2$, more preferably at least 300 $kg/mm^2$ at room temperature. When expressed by a total light transmittance when no coloring occurs as an index of the transparency of the transparent thermosetting resin, it is preferably at least 60%, more preferably, at least 80%. The transparent cross-linked resin can be converted to a hybrid system with an inorganic material within the range in which the transparency thereof is not lowered, and may contain an inorganic bond such as a siloxane bond or a phosphazene bond, without problems.

Specific examples of the components of the transparent thermosetting resin having a glass transition temperature of at least 130° C. include polyolefin resins as typified by polymethacrylic resins such as polymethacrylic acid, polycarboxyphenyl methacrylamide, etc., and polystyrene type resins such as poly(biphenylstyrene); polyether resins as typified by poly(2,6-dimethyl-1,4-phenylene oxide); polycarbonate resins as typified by poly(oxycarbonyloxy-1,4-phenyleneisopropylidene- 1,4-phenylene); polyester type resins such as poly(oxy-2,2,4,4-tetramethyl-1,3-cyclobutyleneoxyterephthaloyl); polysulfonic resins such as poly(oxy-1,4-phenylenesulfonyl-1,4-phenylene), poly(oxy- 1,4-phenyleneisopropylidene-1,4-phenyleneoxy- 1,4-phenylenesulfonyl-1,4-phenylene); polyamide type resins such as poly(iminoisophthaloylimino-4,4'-biphenylene); polysulfide type resins such as poly(thio- 1,4-phenylenesulfonyl-1,4-phenylene); unsaturated polyester resins; epoxy resins; melamine resins; phenol resins; diallyl phthalate type resins; polyimide type resins; polyphosphazene type resins; and so forth. The transparent thermosetting resin exhibiting the thermal property described above can be obtained by introducing a three-dimensional cross-linkage structure into these polymer groups. From the aspects of transparency and moldability, in particular, a polyolefin resin is preferred, but more preferred is a polyolefin copolymer obtained by polymerizing a composition containing polyfunctional monomers having at least two unsaturated groups.

As the copolymer described above, preferably used is a copolymer containing 20 to 98 wt % of the monomer represented by the general formula (A) and 2 to 80 wt % of the polyfunctional monomer having at least two unsaturated groups, wherein the total weight proportion of the monomer of the general formula (A) and the polyfunctional monomer having at least two unsaturated groups is at least 30 wt %.

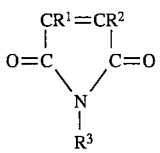

wherein $R^3$ represents a substituent selected from the group consisting of hydrogen and $C_1$ to $C_{20}$ hydrocarbon groups, and $R^1$ and $R^2$ each independently represents a substituent selected from the group consisting of hydrogen, a methyl group and an ethyl group.

$R^1$ and $R^2$ contained in the maleimide derivatives represented by the general formula (A) may be the same or different.

When $R^3$ is a hydrocarbon group, specific examples include linear alkyl groups such as a methyl group, an ethyl group, a propyl group, an octyl group, an octadecyl group, etc.; branched alkyl groups such as an isopropyl group, a sec-butyl group, a tert-butyl group, an isopentyl group, etc.; alicyclic hydrocarbon groups such as a cyclohexyl group, a methyl-cyclohexyl group, etc.; aryl groups such as a phenyl group, a methylphenyl group, etc.; and aralkyl groups such as a benzyl group, a phenethyl group, etc.

Furthermore, each of $R^1$, $R^2$ and $R^3$ may be substituted by various substituents such as a halogeno group, e.g., fluorine, chlorine and bromine, a cyano group, a carboxyl group, a sulfonic group, a nitro group, a hydroxy group, an alkoxy group, and so forth.

Definite examples of the compounds represented by the general formula (A) are N-methylmaleimide, N-butylmaleimide, N-phenylmaleimide, N-o-methylphenylmaleimide, N-m-methylphenylmaleimide, N-p-methylphenylmaleimide, N-o-hydroxyphenylmaleimide, N-m-hydroxyphenylmaleimide, N-p-hydroxyphenylmaleimide, N-methoxyphenylmaleimide, N-m-methoxyphenylmaleimide, N-p-methoxyphenylmaleimide, N-o-chlorophenylmaleimide, N-m-chlorophenylmaleimide, N-p-chlorophenylmaleimide, N-o-carboxyphenylmaleimide, N-p-carboxyphenylmaleimide, N-p-nitrophenylmaleimide, N-ethylmaleimide, N-cyclohexylmaleimide, N-isopropylmaleimide, and so forth.

These monomers may be used either alone or as a mixture of two or more thereof. Among these maleimide compounds, alkylmaleimide and cycloalkylmaleimide are particularly preferred from the aspects of yellowing after a heat resistance test, and weather resistance, and particularly preferred are N-iso-propylmaleimide and N-cyclohexylmaleimide. Most preferred is a combined use of N-alkylmaleimide and N-alicyclic alkylmaleimide such as N-isopropylmaleimide in combination with N-cyclohexylmaleimide. The proportion of the N-alkylmaleimide and the N-alicyclic alkylmaleimide should be experimentally determined appropriately in accordance with the kind and amount of the polyfunctional monomer having at least two unsaturated groups. Generally, however, the N-alicyclic maleimide is preferably used in the amount within the range of 10 to 500 parts by weight based on 100 parts by weight of the N-alkylmaleimide, to thereby exhibit the effect of the combined use thereof.

Next, the polyfunctional monomers having at least two unsaturated groups will be explained. The term "polyfunctional monomers having at least two unsaturated groups" means those monomers having at least two unsaturated functional groups copolymerizable with the maleimide described above, and examples of the copolymerizable functional groups are a vinyl group, a methylvinyl group, an acrylic group, a methacrylic group, and so forth. The monomers containing at least two different copolymerizable functional groups in one molecule are also included in the polyfunctional monomers according to the present invention.

Definite preferred examples of such polyfunctional monomers having at least two unsaturated groups described above are di-, tri- and tetra-(meth)acrylates of polyhydric alcohols such as ethylene glycol di(meth)acrylate, diethylene glycol di(meth)acrylate, triethylene glycol di(meth)acrylate, glycerol (di/tri-)(meth)acrylate, trimethylolpropane (di/tri-)(meth)acrylate, pentaerythritol (di/tri/tetra-)(meth)acrylate, etc.; aromatic polyfunctional monomers such as p-divinylbenzene, o-divinylbenzene, etc.; esters such as vinyl (meth)acrylates, allyl (meth)acrylates, etc.; dienes such as butadiene, hexadiene, pentadiene, etc.; polyfunctional monomers having a phosphazene structure derived from dichlorophosphazene as the starting material; and polyfunctional monomers having a heteroaromic ring structure such as triallyl isocyanurate.

In the polyolefin type copolymer composition described above, 20 to 98 wt % of the monomer represented by the general formula (A) described above must be contained. If the content is less than 20 wt %, a sufficient heat resistance, mechanical strength, optical isotropy, etc., cannot be obtained. If the content exceeds 98 wt %, the degree of cross-linkage drops, and thus the required solvent resistance, and reduction of the water absorption ratio, etc., cannot be obtained. Therefore, the content is preferably 30 to 80 wt %, more preferably, 40 to 60 wt %.

The polyfunctional monomer having at least two unsaturated groups as the other essential component must be contained in a proportion of 2 to 80 wt % in the thermosetting polymer composition. If the content is less than 2 wt %, the three-dimensional cross-linkage does not sufficiently proceed, and the heat resistance and solvent resistance, etc., are lowered. If the content exceeds 80 wt %, the impact resistance, etc., is lowered and the loss of the characteristics of the plastic material becomes remarkable.

Preferably, various copolymerizable monomers are used in combination in the polyolefin type copolymer composition described above, to thus improve the mechanical strength, optical isotropy, refractive index, low water absorption, dyeability, heat resistance, and impact resistance, and so forth. Examples of such monomers that can be conjointly used are aromatic vinyl monomers, olefinic vinyl monomers, (meth)acrylic monomers and their ester monomers, polyvalent carboxylic anhydrides, and so forth. Definite examples of the aromatic vinyl monomers include styrene, α-methylstyrene, p-methylstyrene, p-tert-butylstyrene, vinyltoluene, chlorostyrene and bromostyrene. Generally used are styrene, α-methylstyrene and p-methylstyrene, because the properties thereof are suitable for the copolymerization and they are readily available industrially. Definite preferred examples of other vinyl monomers include vinyl cyanide monomers such as acrylonitrile and methacrylonitrile; (meth)acrylate (ester) type monomers such as methyl methacrylate, methyl acrylate, cyclohexyl methacrylate, t-butyl methacrylate, benzyl methacrylate, acrylic acid and methacrylic acid; and maleic anhydride.

The total content of the monomer represented by the general formula (A) and the polyfunctional monomer as the essential components in the polyolefinic compolymer composition described above must be at least 30 wt % in the thermosetting resin composition, and preferably is at least 40 wt %. If less than 30 wt %, a polymer having excellent transparency, heat resistance, chemical resistance, and impact resistance, etc., cannot be obtained.

The addition of various UV-absorbers, antioxidants and antistatic agents to the transparent thermosetting resin is useful for improving the light resistance, oxidation degradation property, and antistatic property. It is particularly preferred to copolymerize a monomer having a UV absorbing property or an antioxidation property because these properties can be improved without lowering the chemical resistance and heat resistance. Preferred examples of such monomers are benzophenone type UV absorbers having an unsaturated double bond, phenyl benzoate type UV absorbers having an unsaturated double bond and (meth)acryl monomers having a hindered amino group as a substitution group. If the content is less than 0.5 wt %, the effect of addition cannot be recognized, and if more than 20 wt %, the heat resistance and mechanical strength are lowered.

The polymerization method of the transparent thermosetting resin according to the present invention is not particularly limited, and the polymerization can be carried out generally by known methods. When the transparent thermosetting resin is a polyolefinic copolymer, the polymerization can be carried out by keeping the mixture of the monomers described above at a predetermined temperature in the presence or absence of a radial initiator. Various polymerization methods such as bulk polymerization, solution polymerization, suspension polymerization, and casting polymerization can be employed. The degree of polymerization of the transparent thermosetting resin of the present invention is not particularly limited but a higher polymerization degree is preferred. In view of a post-processing such as solution coating and vacuum deposition, the degree of polymerization is preferably at least 90%. The polymerization of the transparent thermosetting resin of the present invention can be carried out at a temperature of 30° to 250° C., and the rate of polymerization can be increased at a polymerization temperature of not lower than 130° C., preferably of not lower than 150° C.

There is no particular limitation to the molding method of the transparent thermosetting resin of the present invention, but a casting polymerization method is considered an effective molding method.

The plastic optical article according to the present invention is produced by providing a transparent coating on the transparent thermosetting resin described above, and the transparent coating may be a coating film containing an organic polymer. Definite examples of the organic polymers constituting the transparent coating are an acrylic resin, a silicone resin, a polyurethane resin, an epoxy resin, a melamine resin, a polyolefinic resin, celluloses, a polyvinyl alcohol resin, a urea resin, a nylon resin, and a polycarbonate resin. These resins can be used either alone or in mixture of at least two thereof, and a three-dimensional cross-linking can be made by using various curing agents and cross-linking agents. For an application where the surface hardness is particularly important, a curable resin is preferred. For example, a simple or complex system of the acrylic resin, silicone resin, epoxy resin, polyurethane resin and melamine resin is preferably used. Where various properties such as the surface hardness, the heat resistance, the chemical resistance, and transparency, etc., are taken into consideration, the silicone resin preferably is used as the organic polymer and more preferably, polymers obtained from organosilicon compounds represented by the following general formula (B) or their hydrolyzates can be mentioned.

  (B)

wherein $R_4$ is a $C_1$ to $C_{10}$ organic group, $R^5$ is a $C_1$ to $C_6$ hydrocarbon group or halogenated hydrocarbon group, X is a hydrolyzing group, and a and b are 0 or 1.

Examples of the organosilicon compounds represented by the general formula (B) include tetraalkoxysilanes and their hydrolyzates such as methyl silicate, ethyl silicate, n-propyl silicate, iso-propyl silicate, n-butyl silicate, sec-butyl silicate and t-butyl silicate; trialkoxysilanes, triacyloxysilanes or triphenoxysilanes or their hydrolyzates such as methyltrimethoxysilane, methyltriethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxy-silane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybuthyltrimethoxysilane, δ-glycidoxybutyltriethoxysilane, (3,4-epoxycyclohexyl)methyltrimethoxysilane, (3,4-epoxycyclohexyl)methyltriethoxysilane, β-( 3,4-epoxycyclohexyl)ethyltrimethoxysilane, β-( 3,4-epoxycyclohexyl)ethyltripropoxysilane, β-( 3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltrimethoxylsilane, etc.; and dialkoxysilanes, diphenoxysilanes or diacyloxysilanes or their hydrolyzates such as dimethyldimethoxysilane, phenylmethyldimethoxysilane, dimethyldiethoxysilane, phenylmethyldiethoxysilane, δ-chloropropylmethyldimethoxysilane, δ-chloropropylmethyldiethoxysilane, dimethyldiacetoxysilane, δ-methacryloxypropylmethyldimethoxysilane, δ-methacryloxypropylmethyldiethoxysilane, δ-mercaptopropylmethyldimethoxysilane, δ-mercaptopropylmethyldiethoxysilane, δ-aminopropylmethyldimethoxysilane, δ-aminopropylmethyldiethoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, δ-glycidoxypropylmethyldimethoxysilane, δ-glycidoxypropylmethyldiethoxysilane, δ-glycidoxypropylmethyldipropoxysilane, δ-glycidoxypropylmethyldibutoxysilane, δ-glycidoxypropylmethylmethoxyethoxysilane, δ-glycidoxypropylmethyldiphenoxysilane, δ-glycidoxypropylmethyldiacetoxysilane, δ-glycidoxypropylethyldimethoxysilane, δ-glycidoxypropylethyldiethoxysilane, δ-glycidoxypropylvinyldimethoxysilane, δ-glycidoxypropylvinyldiethoxysilane, δ-glycidoxypropylphenyldimethoxysilane, δ-glycidoxypropylphenyldiethoxysilane, etc.

One or at least two kinds of these organosilicon compounds can be added. In particular, to impart a dyeability, the use of the organosilicon compound containing the epoxy group and the glycidoxy group is preferable, and the resulting product has a high addition value.

Besides the silicone resin, it is possible to add an acrylic resin, a polyurethane resin, an epoxy resin, a melamine resin, a polyolefin resin, celluloses, a polyvinyl alcohol resin, a urea resin, a nylon resin, a polycarbonate resin, and the like, to the film formation component consisting of the silicone resin as its principal component; these are not particularly limited but must be within the range where the transparency is not deteriorated and the required surface hardness can be obtained.

To lower the curing temperature and to further promote curing, the organosilicon compounds described above preferably are used after they are hydrolyzed. The hydrolysis is effected by adding pure water or an acidic aqueous solution of hydrochloric acid, acetic acid or sulfuric acid and stirring the mixture. Furthermore, the degree of hydrolysis can be easily controlled by adjusting the amount of addition of pure water or the acidic aqueous solution. To promote curing, the addition of pure water or the acidic aqueous solution is preferably added in an amount of the equimolar to three times moles to the hydrolyzing group contained in the compound represented by the general formula (B) when a hydrolysis is effected.

Since an alcohol, etc., is generated during the hydrolysis, the hydrolysis can be carried out without a solvent, but to promote the hydrolysis further uniformly the hydrolysis can be carried out after the organosilicon compound and the solvent are mixed. Depending on the intended object, the alcohol, etc., can be removed by heating and/or by evaporating at a reduced pressure after the hydrolysis. It is also possible to later add a suitable solvent.

Preferably, the composition described above is generally diluted with a volatile solvent and is applied as a liquid composition. The solvent for this coating composition is not particularly limited, but must not deteriorate the surface properties of the coated article during use. Furthermore, the solvent should be determined in consideration of the stability of the composition, wettability to the substrate, volatility, and so forth. One kind of solvent or two or more kinds of solvents as a mixture can be used. Specific examples of these solvents are alcohol, esters, ethers, ketones, halogenated hydrocarbons, aromatic hydrocarbons such as toluene, xylene and aprotic polar solvents.

Fine particles of metal oxide are preferably added to the transparent film of the present invention to thus improve the surface hardness, to adjust the refractive index, and to improve the mechanical strength, thermal characteristics and electric conductivity. Such fine particles of metal oxide are not particularly limited as long as they do not deteriorate the transparency in the film state. From the aspects of an improvement in the operation efficiency and the transparency, however, sols that are dispersed in a colloidal form are particularly preferred. Definite preferred examples include silica sol, titania sol, zirconia sol, ceria sol, antimony oxide sol, ITO (Indium Tin Oxide) sol, tin oxide sol, and so forth.

The amount of addition of the fine particles of metal oxide is not particularly limited, but to further remarkably exhibit the effect at least 1 wt % and up to 80 wt % is preferably contained in the transparent film. If less than 1 wt %, a clear effect of addition cannot be observed and if more than 80 wt %, problems arise such as an inferior adhesion to the plastic substrate, the occurrence of the cracks in the film itself, and lowered impact resistance.

The diameter size of the fine particles of metal oxide is not particularly limited, but is generally from 1 to 200 mµ, preferably from 5 to 100 mµ, more preferably 20 to 80 mµ. When an metal oxide having a particle size greater than 200 mµ is used, the transparency of the resulting coating film becomes poor and the turbidity is increased. To improve the dispersibility of the fine particles of metal oxide, various surface treatments of the fine particles may be carried out and various surfactants and amines may be added.

Various curing agents can be combined and used with the coating composition used at the time of the formation of the transparent coating film in the present invention, to thus make it possible to promote the curing and to accomplish a hardening at a low temperature. Various curing agents for epoxy resin or organosilicone resin can be used as the curing agent.

Definite examples of these curing agents are various organic acids and their acid anhydrides, nitrogen-containing organic compounds, various metal complexes, metal alkoxides, various salts such as organic carboxylates and carbonates of alkali metals, and radical polymerization initiators such as peroxides and azobisisobutylnitrile. Two or more kinds of these curing agents can be used as a mixture. Among these curing agents, the aluminum chelate compounds illustrated below are particularly useful for the object of the present invention, from the aspects of stability of the coating composition and the prevention of a coloring of the film after coating.

The aluminum chelate compound referred to herein is the aluminum chelate compound represented by the general formula $$AlX_nY_{3-n}$$

wherein X is OL with L representing a lower alkyl group; Y is at least one member selected from the ligands derived from the compounds represented by the general formula $$M^1COCH_2COM^2$$

wherein each of $M^1$ and $M^2$ is a lower alkyl group, and the ligands derived from the compounds represented by the general formula $$M^3COCH_2COOM^4$$

wherein each of $M^3$ and $M^4$ is a lower alkyl group.

Although various compounds can be cited as the aluminum chelate compounds represented by the general formula $AlX_nY_{3-n}$, particularly preferred are aluminum acetylacetonate, aluminum bisethylacetoacetate monoacetylacetonate, aluminum di-n-butoxide monoethylacetoacetate and aluminum di iso-propoxide monomethylacetoacetate from the aspects of the solubility and the stability in the composition and the effect as the curing catalyst. Two or more of these compounds can be used as a mixture.

Some of the transparent coating films according to the present invention can be dyed by various dyes, particularly by a disperse dye. In the case of the dyed product, various transition metal compounds or their reaction products are preferably added, to improve the color fastness to light of the product. Definite examples of these metal compounds are acetylacetonate metal salts, bisdithiol-α-diketone metal salts, bisphenylthiol metal salts, bisphenyldithiol metal salts, dithiocarbaminic acid metal salts, salicylaldehyde oxime metal salts, thiobisphenolate metal salts and phosphone metal salts. Among them the acetylacetonate chelate compounds are particularly preferably used because the stability in the coating composition is excellent. The amount of addition of these transition metal compounds should be experimentally determined in accordance with the application of the transparent article, the kind of the diluting solvent, and the kinds of other components, but an amount within a range of 0.001 to 10 wt % in the resulting film is preferably used, from the aspects of the solubility and a whitening of the coating film. If the amount is less than 0.001 wt %, the addition effect cannot be obtained, and if more than 10 wt %, the haze of the film becomes very strong. No problem arises even if the bonding state of the metal of these transition metal compounds changes due to a chemical change during the formation process of the transparent coating film, but they are preferably contained as the chelate compound in the film, to obtain a greater effect.

Various surfactants can be added to the coating composition used for forming the transparent film according to the present invention, to thus improve the flow at the time of coating, improve the flatness of the transparent film, and reduce the friction coefficient of the film surface. Particularly, a block or graft copolymer of dimethyl polysiloxane and alkylene oxide and a fluorine type surfactant are effective.

Inorganic materials other than the fine particles of metal oxide can be added to the coating composition used at the time of the formation of the transparent coating film according to the present invention, within the range in which the film properties and transparency are not greatly lowered. The combined use with these additives can improve various characteristics such as the adhesion to the substrate, chemical resistance, surface hardness, durability, and dyeability. The inorganic materials that can be added, as described above, are metal alkoxides represented by the following general formula (I), chelate compounds and/or their hydrolyzates.

$$M(OR)_m \qquad (I)$$

wherein R is an alkyl group, an acyl group or an alkoxyalkyl group, and m is the same value as the number of charges of the metal M, and M is silicon, titanium, zirconium, antimony, tantalum, germanium or aluminum.

Furthermore, a UV-absorber can be added to improve the weatherability, or an antioxidant can be added as a method of preventing lowering of the heat resistance.

The transparent coating film of the present invention can be obtained by curing the coating composition described above and by the heat-treatment. The heating temperature is suitably selected in consideration of the composition of the coating composition and the heat resistance of the transparent thermosetting resin, and is preferably from 50° to 250° C.

As coating means of the film deposited on the transparent thermosetting resin in the present invention, ordinary coating methods such as brush coating, dip coating, roll coating, spray coating, spin coating, flow coating, etc., can be used.

When coating the coating composition of the present invention is carried out, various pre-treatments can be effectively made, to thus improve the cleanness, adhesion, moisture resistance, and so forth. Particularly preferred methods are an activating gas treatment, chemical treatment, and a UV treatment.

The activating gas treatment means the treatment utilizing ions, electrons or activating gases generated at a normal or reduced pressure. The methods of generating such an activating gas include corona discharge, and a high voltage discharge using D.C., a low frequency, high frequency or microwave, at a reduced pressure. Particularly preferred is a low temperature plasma treatment by a radio frequency discharge at a reduced pressure, from the aspects of production and reproduction.

The gas used is not particularly limited, and definite examples thereof include oxygen, nitrogen, hydrogen, carbon dioxide, sulfur dioxide, helium, neon, argon, freon, vapor, ammonia, carbon monoxide, chlorine, nitrogen monoxide, nitrogen dioxide, and so forth. These gas can be used alone or as a mixture of two or more. Among the examples described above, oxygen-containing gases such as air are particularly preferred. Oxygen is preferably used to improve the adhesion. During the processing, the temperature of the treated substrate can be raised for the same purpose.

Definite examples of the chemical treatment include an alkali treatment using caustic soda, an acid treatment using hydrochloric acid, sulfuric acid, potassium dimanganate, potassium dichloromate, etc., and an organic solvent treatment.

The pre-treatment described above can be executed either continuously or step-wise.

The thickness of the transparent film in the present invention is not particularly limited, but is preferably within the range of 0.1 to 50μ, to thus maintain the bonding strength and hardness, more preferably 0.3 to 10μ. When coating the film, the composition is diluted in various solvents to adjust the operation efficiency and the film thickness, and various solvents can be used such as water, alcohol, esters, ethers, halogenated hydrocarbons, dimethylformamide, dimethyl sulfoxide, and so forth, in accordance with the intended object. A mixed solvent also can be used, whenever necessary. Polar solvents such as water, alcohols, dimethylformamide, ethylene glycol, diethylene glycol, triethylene glycol, benzyl alcohol, phenetyl alcohol, phenyl cellosolve, etc., are preferably used.

When expressed by the bending modulus at 170° C. as an index, the mechanical properties of the plastic optical article according to the present invention are preferably 20 to 300 kg/mm². If the value is less than 20 kg/mm², the rigidity becomes poor and problems occur with the mechanical characteristics. If more than 300 kg/mm², cracking of the substrate occurs during handling and the production yield drops.

To obtain the bending modulus described above, it is useful in the present invention to heat the plastic substrate and the transparent film obtained as described above. Known methods such as a method using a heater and a method using a light irradiation by an infrared ray can be used as the heat treating method.

The heat treating atmosphere includes a gas atmosphere, solution atmosphere, and reduced pressure atmosphere. From the aspects of a yellowing of the treated article due to oxidation, and ease of operation, the reduced pressure atmosphere or the gas atmosphere of nitrogen, carbon dioxide, helium, neon, argon, etc., are particularly preferable. These gases can be used alone or as a mixture of two or more thereof. The heat treating temperature should be determined in accordance with the substrate and transparent film employed, but is generally from 100° to 300° C., preferably from 120° to 250° C. If the temperature is lower than this range, a clear effect cannot be observed, and if higher than this range, a thermal decomposition and cracks occur, and thus the problem of yellowing is more likely to occur. The heat treating time is suitably selected in accordance with the shape of the substrate used, the transparent film, and the heating treating temperature, and preferably is 1 second to 24 hours more preferably from one minute to 12 hours. If the heat treating time is shorter than the value described above, a clear effect cannot be observed and if longer, yellowing and a problem with the operation efficiency are likely to occur. Furthermore, known methods can be used as the method of fixing the treated article at the heat treatment. Although the fixing method should be experimentally determined in accordance with the shape and thickness of the treated article, the heat treating temperature and the heat treating time, heat treatment on a flat sheet-like support is preferred if the treated article is sheet-like, for example, and the surface flatness of the flat sheet-like support becomes very important particularly when the surface flatness of the treated article is required. Glass materials such as polished glass, ground glass, etc., metal materials such as aluminum, stainless steel, etc., and polymer materials such as Teflon, polyimide, etc., are preferably used as the support.

When expressed by a total light transmittance when no coloring occurs, as an index, the transparency of the plastic optical article according to the present invention is preferably at least 60%, more preferably 80%. When the plastic optical article is used for an application requiring optical isotropy, such as for a liquid crystal display substrate, an optical disk substrate, or the like, the birefringence of the plastic optical article is preferably below 30 nm, more preferably below 15 nm.

The plastic optical article obtained in accordance with the present invention has excellent transparency, heat resistance, light resistance, weatherability, impact resistance, glazing, chemical resistance, and optical isotropy, and therefore, can be applied to optical lenses such as eyeglass lenses, sunglass lenses, camera lenses, video camera lenses, gorgle lenses, contact lenses, etc., a substrate for a liquid crystal display, a light-guiding waveguide plate of the liquid crystal display, a substrate for electro-luminescence display and various other display substrates, front-, rear- and roof-windows of automobiles and airplanes, and to an optical disk substrate, as it has an excellent optical isotropy.

It is also possible to form a transparent electro-conductive film such as indium-tin oxide (ITO, Indium Tin Oxide) on the plastic optical article and to use it as a transparent conductor material. As the transparent conductor film material, it can be applied to electric component circuit materials such as capacitors and resistors, copying materials such as electrophotography and electrostatic recording, transparent electrodes for inputting signals such as those for liquid crystal displays, electrochromic displays, electroluminescence displays, touch panels, etc., and photoelectric conversion devices such as a solar cells, optical amplifiers, and so forth. Furthermore, it can be applied to various applications such as a prevention of electrostatic charging, as a shielding against electromagnetic waves, and for surface heat generators, sensors, and so forth. When the transparent electro-conductive film such as ITO is formed on the plastic optical article of the present invention, the conductivity is maintained even at a high temperature, and therefore, the plastic optical article can be used as a heat-resistant transparent conductor material.

Conductive thin films of metal oxides such as ITO, tin oxide, cadmium oxide, etc., metals such as gold, silver, copper, palladium, nickel aluminum, chromium, etc., and conductive polymers, are used as the transparent electro-conductive film deposited on the plastic optical article of the present invention. Among them, ITO is preferably used in consideration of various properties such as the transparency and a lowered resistance. Known methods can be used to form the metal oxide thin film such as the ITO film and the metal thin film, such as a vacuum deposition method, an ion plating method, a sputtering method, a coating method and a spraying method. Known methods such as a D.C. sputtering method, an R.F. sputtering method, a magnetron sputtering method, etc., can be used as the sputtering method ["Sputtering Phenomenon", written by Akira Kimbara, published by The Tokyo University Press, 1984]. Where the plastic optical article of the present invention is used as a transparent electro-conductive sheet, the thickness thereof may preferably be 0.1 to 10 mm, more preferably 0.3 to 1.0 mm, in view of mechanical properties.

When the transparent electro-conductive film is formed on the plastic optical article according to the present invention, a transparent electro-conductive film substrate having an excellent heat resistance can be obtained, and therefore, it can be used as a liquid crystal display substrate. This transparent electro-conductive film substrate can be applied to a liquid crystal display of a simple matrix type such as a TN (Twisted Nematic) type, an STN (Super Twisted Nematic) type, a ferroelectric liquid crystal (FLC) type, etc., and to an active matrix type liquid crystal display such as an MIM (Metal-Insulator-Metal) type, a TFT (Thin-Film Transistor) type, and so forth, but is preferably used for the simple matrix type liquid crystal display, because the production process is relatively simple.

When the plastic optical article of the present invention is used as the liquid crystal display substrate, a structure sandwiching the liquid crystal is employed, depending on the plastic optical article. Namely, in a conventional liquid crystal display using a glass substrate, the plastic optical article of the present invention replaces the glass substrate. More definitely, there is employed a structure in which a transparent electro-conductive layer is formed on the plastic optical article, a passivation film is then formed, whenever necessary, and an orientation film is further superposed thereon to form the substrate, and these substrates sandwich the liquid crystal layer between them. A polarizing film is disposed outside each substrate sandwiching the liquid crystal layer. A retardation film and an light-reflecting plate are further disposed on the liquid crystal display, whenever necessary.

Known methods can be applied as the production method of the liquid crystal display using the plastic optical article of this invention. In the case of the simple matrix liquid crystal display, for example [refer to "Liquid Crystal Handbook", edited by Nippon Gakujutsu Shinkokai, No. 142 Committee, published by Nikkan Kogyo Shimbunsha, 1989, p. 531], the liquid crystal display cell can be obtained through a series of steps such as washing of the substrate, formation of the transparent electro-conductive film, fine patterning process of the transparent electro-conductive film (coating of resist, development, etching, washing-away of the resist), formation of an orientation film, rubbing processing, washing, printing of a sealant, bonding of the substrates, heating and pressurization, vacuum deaeration, charging of the liquid crystal, sealing of the charging port, cutting of the liquid crystal cell, fitting of the polarizing film and light-reflecting plates, and so forth. In these liquid crystal display production steps, the production condition should be set in consideration of various characteristics of the liquid crystal display substrate of the plastic optical article such as heat resistance, mechanical characteristics, and so forth.

Hereinafter, the present invention will be further explained with reference to the following examples.

The various characteristics of the transparent three-dimensional cross-linked resin are measured as follows.

The total light transmittance is measured on the basis of ASTM D-648, and the solvent resistance is evaluated by rubbing the surface of the resin with a cotton impregnated with acetone, and evaluating the change of luster at that time with the naked eye. The bending test is carried out on the basis of JIS K-7203, at room temperature. The glass transition temperature is measured using a Mettler TA3000 (measured by second run).

The optical article provided with the transparent film is measured in the following way.
(a) Transparency:
(a) Transparency:
The transparency of the article is examined by eye under a fluorescent lamp.
(b) Abrasion resistance;
The surface is rubbed by steel wool #0000 and the degree of scratching is evaluated.
Evaluation is as follows:
◯: excellent
X: poor;
(c) Adhesion:
One-hundred squares are formed in the article surface by a steel knife, in such a manner that it reaches the substrate of 1 mm depth, and a cellophane adhesive tape ("Cello-Tape", a trade name of Nichiban K.K.) is strongly bonded thereto. Then, the tape is rapidly peeled in an orthogonal direction, to thus determine any peeling of the coating film.
(d) Heat resistance:
A sample is placed on a glass plate and is heated at 150° C. for 2 hours, and the surface condition (flatness, etc.) then examined.

In the following Tables, "◯" signifies good heat resistance.
(e) Mechanical properties (when heated to 170° C.):
The bending modulus at a measurement temperature of 170° C. is measured under a condition in which the distance between support points is 10 mm and the bending rate is 0.5 mm/min, by using a TOM universal tester (a product of Shinko Tsushin K.K.).
(f) Yellowing:
The plastic optical article is placed on a white sheet of paper, and the degree of yellowing is examined by eye. The judgement is made as follows.
◯: colorless and transparent
Δ: slightly yellowed
X: remarkably yellowed

EXAMPLE 1

(1) Preparation of Transparent Three-Dimensional Cross-Linked Resin

| | |
|---|---|
| isopropylmaleimide | 26.5 g |
| styrene | 18.5 g |
| divinyl benzene | 5.0 g |
| azobisisobutyronitrile | 0.05 g |

The compounds listed above are mixed and dissolved, and are cast-molded by a casting polymerization. The casting polymerization is carried out as follows.

The outer peripheral portions of two glass plates having a dimension of 150 mm by 150 mm and a thickness of 5 mm are bonded by soft vinyl chloride gaskets and the glass plates are assembled in such a manner as to define a distance of 2 mm therebetween. The monomer mixture described above is poured into the glass plate assembly and is polymerized at 70° C. for 8 hours and further at 100° C. for 1 hour and 150° C. for 1 hour, thus obtaining a transparent cast-moled plate (hereinafter referred to as the "cast plate (I)".

The glass transition temperature of this cast plate (I) is 180° C., the total light transmittance is 90%, the bending modulus is 398 kg/mm$^2$, and the bending strength is 9 kg/mm$^2$ at room temperature. Also, the solvent resistance is excellent.

(2) Preparation of Coating Composition (A)

(a) Preparation of γ-glycidoxypropyltrimethoxy-silane hydrolyzate:
953 g of γ-glycidoxypropyltrimethoxysilane is poured into a reactor equipped with a stirrer. While the liquid temperature is kept at 10° C. and the liquid is stirred by a magnetic stirrer, 21.8 g of a 0.01N aqueous hydrochloric acid solution is gradually added drop-wise and after the drop addition is completed, cooling is stopped, and the hydrolyzate of γ-glycidoxypropyltrimethoxysilane is thus obtained.

(b) Preparation of Coating
To the silane hydrolyzate described above are added 216 g of methanol, 216 g of dimethylformamide, 0.5 g of a silicon type surfactant and 67.5 g of a bisphenol-A type epoxy resin ("Epicoat 827", a product of Yuka-Shell Epoxy K.K.). The mixture is stirred and 270 g of colloidal sol of antimony pentoxide ("Antimon Sol A-2550", a product of Nissan Chemical Industries, Ltd., mean particle diameter: 50 mµ) and 3.5 g of aluminum acetyl-acetonate are added. The mixture is sufficiently stirred to provide a coating composition (A).

(3) Production of Plastic Optical Article

The cast plate (I) obtained in item (1) described above is dip-coated in the coating composition (A) obtained in item (2) at a pull-up rate of 20 cm/min, is then preliminarily cured at 100° C. for 10 minutes and is further heated at 100° C. for 4 hours, and a transparent coating film is formed thus on the cast plate (I). The various properties of the resulting transparent plate are tabulated in Table 1.

A transparent electro-conductive thin film (about 0.1 µm thick) consisting of ITO (indium-tin mixed oxide) is formed on the surface of the transparent plate provided with the transparent coating film on the cast plate (I) described above by sputtering. The surface resistivity of the surface having the ITO film formed thereon at room temperature is 50 Ω/square. After being heated at 180° C. for one hour, the transparent film provided with this ITO film is cooled to room temperature, and the surface resistivity is again measured. The surface resistivity is found to be 50 Ω/square, which is the same as the initial value. No change is observed in the appearance, and it is confirmed that the transparent plate has an excellent heat resistance.

EXAMPLE 2

A transparent cast plate (hereinafter referred to as the "cast plate (II)") is obtained in the same way as in Example 1 except that isopropylmaleimide in the preparation of the cast plate (I) in Example 1 is changed by 26.5 g of a mixture consisting of 50 wt % of isopropylmaleimide and 50 wt % of cyclohexylmaleimide.

The glass transition temperature of this cast plate (II) is 190° C., the total light transmission factor is 90%, the bending elastic modulus is 400 kg/mm$^2$, and the bending strength is 8 kg/mm$^2$ at room temperature. Also, the solvent resistance is excellent.

A transparent coating film is applied on the resulting cast plate (II) using the coating composition (A) in the same way as in Example 1 to produce the transparent plate. The various properties of the resulting transparent plate are tabulated in Table 1.

EXAMPLE 3

The transparent plate (hereinafter referred to as the "cast plate (III)") is obtained in the same way as in Example 1 except that styrene in the production of the cast plate (I) in Example 1 is replaced by methyl methacrylate. The resulting cast plate (III) has a glass transition temperature of 150° C. and a total light transmittance of 91%. The bending modulus is 360 kg/mm$^2$ and the bending strength is 9 kg/mm$^2$ at room temperature. Also, the solvent resistance is excellent.

A transparent coating film is formed on the resulting cast plate (III) using the coating composition (A) in the same way as in Example 1 to produce a transparent plate. The various properties of the resulting transparent plate are tabulated in Table 1.

EXAMPLE 4

| | |
|---|---|
| isopropylmaleimide | 45 g |
| divinyl benzene | 5 g |
| azobisisobutyronitrile | 0.1 g |

The compounds listed above are mixed and dissolved, and are cast-polymerized to obtain a cast plate (hereinafter referred to as the "cast plate (IV)") in the same way as the production of the cast plate (I) in Example 1. The resulting cast plate (IV) has a glass transition temperature of 230° C., a total light transmttance of 90%, a bending elastic modulus of 380 kg/mm$^2$, and a bending strength of 5 kg/mm$^2$ at room temperature. Also, the solvent resistance is excellent.

A transparent coating film is applied on the resulting cast plate (IV) using the coating composition (A) in the same way as in Example 1 to produce a transparent plate. The various properties of the resulting transparent plate are tabulated in Table 1.

COMPARATIVE EXAMPLE 1

The various properties of the cast plate (I) produced in Example 1 (where the transparent coating film is not provided), such as the abrasion resistance and heat resistance, etc., are evaluated. The results are tabulated in Table 1.

An ITO film is directly formed on the cast plate (I) described above by sputtering and the heat resistance is measured. After the sample is heated at 180° C. for 1 hour, cracks occur in the ITO film and a current cannot flow.

COMPARATIVE EXAMPLE 2

| | |
|---|---|
| isopropylmaleimide | 26 g |
| styrene | 24 g |
| azobisisobutyronitrile | 0.1 g |

The compounds listed above are mixed and dissolved, and a cast plate (hereinafter referred to as the "cast plate (V)") consisting of a transparent thermoplastic resin is produced by cast polymerization in the same way as for the production of the cast plate (I) in Example 1. The resulting cast plate (hereinafter referred to as the "cast plate (V)") has a glass transition temperature of 175° C., a total light transmittance of 90%, a bending elastic modulus of 370 kg/mm$^2$, and a bending strength of 9 kg/mm$^2$ at room temperature, but the solvent resistance is poor.

A transparent coating film is deposited on the resulting cast plate (V) in the same way as in Example 1 to produce a transparent plate. The various properties of the resulting transparent plate are tabulated in Table 1.

COMPARATIVE EXAMPLE 3

The various properties of a thermoplastic resin plate obtained from diethylene glycol bis-allylcarbonate ("RAV-7 Sheet", a product of Mitsui Petrochemical Industries, Inc.; hereinafter referred to as the "cast plate (VI)") are examined. The glass transition temperature is 70° C., the total light transmittance is 92%, the bending modulus is 230 kg/mm$^2$, the bending strength is 7 kg/mm$^2$ at room temperature, and the solvent resistance is excellent.

A transparent coating film is formed on the cast plate (VI) in the same way as in Example 1, to produce a transparent plate. The various properties of the resulting transparent plate are tabulated in Table 1.

TABLE 1

| | Transparency | Abrasion resistance | Adhesion property | Heat resistance |
|---|---|---|---|---|
| Example 1 | good | o | good | o |
| Example 2 | good | o | good | o |
| Example 3 | good | o | good | o |
| Example 4 | good | o | good | o |
| Comp. Example 1 | good | x | — | slight surface abnormality occurs |
| Comp. Example 2 | opaque | o | inferior | o |
| Comp. Example 3 | good | o | good | surface abnormality occurs |

EXAMPLE 5

(1) Preparation of Coating Solution (B)

(a) Preparation of γ-glycidoxypropyltrimethoxysilane hydrozate:

210.7 g of γ-glycidoxypropyltrimethoxysilane is charged into a reactor equipped with a stirrer. While the liquid is kept at a temperature of 10° C. and is stirred by a magnetic stirrer, 48.2 g of a 0.01N aqueous hydrochloric acid solution is gradually added dropwise. After the drop addition is completed, cooling is stopped and thus a γ-glycidoxypropyltrimethoxysilane hydrolyzate is obtained.

plate. The various properties of the resulting transparent plate are tabulated in Table 2.

TABLE 2

|  | Transparency | Abrasion resistance | Adhesion property | Heat resistance |
| --- | --- | --- | --- | --- |
| Example 5 | good | o | good | o |
| Example 6 | good | o | good | o |
| Example 7 | good | o | good | o |
| Example 8 | good | o | good | o |
| Comp. Example 1 | good | x | — | slight surface abnormality occurs |
| Comp. Example 2 | opaque | o | inferior | o |
| Comp. Example 3 | good | o | good | surface abnormality occurs |

(b) Preparation of coating:

To the silane hydrolyzate described above are added 91.3 g of ethanol, 91.3 g of n-propylalcohol and 0.75 g of a silicone type surfactant, and further, 7.5 g of aluminum acetylacetonate is added and sufficiently stirred, to thus prepare a coating composition (B).

(2) Production of Plastic Optical Article

The cast plate (I) obtained in Example 1 is dip-coated by the coating composition (B) obtained in the item (1) described above at a pull-up rate of 20 cm/min. Next, preliminary curing is carried out at 100° C. for 10 minutes and heating is then carried out at 110° C. for 4 hours, to form a transparent coating film on the cast plate (1). The various properties of the resulting transparent plate are tabulated in Table 2.

A transparent electro-conductive thin film (about 0.1 μm thick) consisting of ITO is formed by sputtering on the surface of the transparent plate provided with the transparent film on the cast plate (I) obtained above. The surface resistivity of the surface having the ITO film formed thereon at room temperature is 50 Ω/square. The transparent film provided with this ITO film is heated at 150° C. for 1 hour and cooled to room temperature, and the surface resistance is again measured. The resistance is found to be 50 Ω/square, which is the same as the initial value. It is confirmed that, since no change occurs in the appearance, the ITO film formed on the transparent plate exhibits an excellent heat resistance.

EXAMPLE 6

The transparent coating film is formed on the cast plate (II) obtained in Example 2 using the coating composition (B) in the same way as in Example 5 to produce a transparent plate. The various properties of the resulting transparent plate are tabulated in Table 2.

EXAMPLE 7

The transparent coating film is formed on the cast plate (III) obtained in Example 3 using the coating composition (B) in the same way as in Example 5 to produce a transparent plate. The various properties of the resulting transparent plate are tabulated in Table 2.

EXAMPLE 8

The transparent coating film is formed on the cast plate (IV) obtained in Example 4 using the coating composition (B) in the same way as in Example 5 to produce a transparent

EXAMPLE 9

A coating film is applied on the cast plate (I) obtained in Example 1 using the coating composition (A) to produce a transparent film, and this transparent film is heat treated at a vacuum of 1 Torr and at 170° C. for 2 hours. The various properties of the resulting plastic optical article are tabulated in Table 3.

A transparent electro-conductive thin film (about 0.1 μm thick) consisting of an ITO is formed on the surface of the plastic optical article obtained as described above by sputtering. The surface resistance of the surface having the ITO film formed thereon at room temperature is 50 Ω/square. The transparent plate provided with this ITO film is heated at 190° C. for 2 hours and cooled to room temperature, and the surface resistance is again measured. The surface resistance is found to be 50 Ω/square, which is the same as the initial value. It is confirmed that, since no change occurs in the appearance, the ITO film deposited on the transparent plate exhibits an excellent heat resistance.

EXAMPLE 10

A plastic optical article is produced (without the transparent conductor thin film) in the same way as in Example 9 except that the heat treatment in vacuum in Example 9 is changed to a heat treatment in a nitrogen atmosphere (atmospheric pressure). The various properties of the resulting plastic optical article are tabulated in Table 3.

EXAMPLE 11

The transparent plate provided with the coating film deposited on the cast plate (I), obtained in Example 1, using the coating composition (B) is further heat treated in a vacuum of 1 Torr and at 170° C. for 2 hours. The various properties of the resulting plastic optical article are tabulated in Table 3.

EXAMPLE 12

(1) Preparation of Coating Composition (C)

(a) Preparation of γ-glycidoxypropyltrimethoxy silane

First 105.4 g of γ-glycidoxypropyltrimethoxysilane is charged into a reactor equipped with a stirrer, then while the liquid temperature is kept at 10° C. and the liquid is stirred by a magnetic stirrer, 24.1 g of a 0.01N aqueous hydrochloric acid solution is gradually added dropwise. After the drop addition is completed, the cooling is stopped to thus obtain a γ-glycidoxypropyltrimethoxysilane hydrolyzate.

(b) Preparation of coating:

To the silane hydrolyzate described above are added 31.7 g of ethanol, 31.7 g of n-propyl alcohol and 0.75 g of a silicone type surfactant and furthermore, 248.8 g of a colloidal silica sol ("OSCAL-1132", a product of Catalysts & Chemicals Industries Co., Ltd.; mean particle diameter = 13mμ) and 7.5 g of aluminum acetylacetonate are added. The mixture is sufficiently stirred to prepare a coating composition (C).

(2) Production of Plastic Optical Article

The cast plate (I) obtained in Example 1 is dip-coated in the coating composition (C) prepared in item (1) described above at a pull-up rate of 20 cm/min, and then a preliminary curing is carried out at 100° C. for 10 minutes. Furthermore, heating is made at 110° C. for 4 hours to form a transparent coating film onto the cast plate (I).

The resulting transparent plate is further heat treated in a vacuum of 1 Torr and at 170° C. for 2 hours. The various properties of the resulting plastic optical article are tabulated in Table 3.

EXAMPLE 13

A plastic optical article (without the transparent electro-conductive film) is produced in the same way as in Example 9 except that the heat treatment in vacuum in Example 9 is changed to the heat treatment in air (atmospheric pressure). The various properties of the resulting plastic optical article are tabulated in Table 3.

COMPARATIVE EXAMPLE 4

A plastic optical article is produced in the same way as in Example 9 except that the transparent coating film in Example 9 is not applied. The various properties of the resulting article are tabulated in Table 3.

An ITO film is further deposited on the plastic optical article obtained above in the same way as in Example 9 and the heat resistance is evaluated. After the sample is heated at 190° C. for 2 hours, cracks occur in the ITO film and a current cannot flow.

The plastic optical articles obtained by the present invention have the following effects.
1. Excellent heat resistance.
2. Excellent solvent resistance and chemical resistance.
3. High surface hardness and excellent abrasion resistance.
4. High transparency.
5. Excellent durability such as light resistance and weatherability.
6. When an inorganic thin film such as a transparent electro-conductive film is deposited on the surface, a thin film having high heat resistance can be obtained.
7. Excellent mechanical characteristics.

We claim:

1. A liquid crystal display substrate wherein a transparent coating is applied to a surface of a transparent cross-linked resin containing at least one maleimide selected from the group consisting of alkylmaleimides and alicyclic alkylmaleimides and said resin having a glass transition temperature of at least 130° C.

2. A liquid crystal display substrate according to claim 1, wherein said transparent coating comprises an organic polymer and particles of metal oxide having a diameter of 1 to 200 mμ.

3. A liquid crystal display substrate according to claim 2, wherein 1 to 80 wt % of said particles of metal oxide is contained in said transparent coating.

4. A liquid crystal display substrate according to claim 1, wherein said transparent coating is an organic polymer obtained from a compound selected from the group consisting of an organosilicon compound represented by the following general formula (B) and its hydrolyzate:

$$R_a^4 R_b^5 SiX_{4-a-b}$$

wherein $R^4$ is a $C_1$ to $C_{10}$ organic group, $R^5$ is a $C_1$ to $C_6$ hydrocarbon group or halogenated hydrocarbon group, X is a hydrolyzable group, and a and b are 0 or 1.

5. A liquid crystal display substrate according to claim 1, wherein said transparent coating consists of a silicone resin as the principal component.

6. A liquid crystal display substrate according to claim 5, wherein said silicone resin is a polymer obtained from an organosilicon compound represented by the general formula (B) or its hydrolyzate $$R_a^4 R_b^5 SiX_{4-a-b}$$

wherein $R^4$ is a $C_1$ to $C_{10}$ organic group, $R^5$ is a $C_1$ to $C_6$ hydrocarbon group or halogenated hydrocarbon group, X is a hydrolyzable group and a and b are 0 or 1.

7. A liquid crystal display substrate according to claim 1, wherein said article has a bending modulus at 170° C. from 20 to 300 kg/mm².

TABLE 3

|  | Transparency | Abrasion resistance | Adhesion property | Heat resistance | Bending elastic modulus at 170° C. (kg/mm²) | Yellowing |
|---|---|---|---|---|---|---|
| Example 9 | good | ○ | good | good | 105 | ○ |
| Example 10 | good | ○ | good | good | 107 | ○ |
| Example 11 | good | ○ | good | good | 105 | ○ |
| Example 12 | good | ○ | good | good | 110 | ○ |
| Example 13 | good | ○ | good | good | 108 | Δ |
| Comp. Example 4 | good | X | — | slight surface abnormality occurs | 11 | X |

8. A liquid crystal display substrate according to claim 1, wherein said transparent cross-linked resin has a glass transition temperature of at least 160° C.

9. A liquid crystal display substrate according to claim 1, wherein said liquid crystal display substrate has at least one transparent electro-conductive layer.

10. A liquid crystal display substrate according to claim 9, wherein the thickness of said transparent cross-linked resin is within the range of 0.3 to 1.0 mm.

11. A liquid crystal display substrate according to claim 9, wherein said transparent electro-conductive layer comprises indium tin oxide.

12. A plastic optical article wherein a transparent coating is applied to a surface of a transparent cross-linked resin having a glass transition temperature of at least 130° C., wherein said transparent cross-linked resin is a copolymer obtained by polymerizing a composition which contains 20 to 98 wt % of a monomer represented by a general formula (A) and 2 to 80 wt % of a polyfunctional monomer having at least two unsaturated groups, and in which the total weight ratio of said monomer represented by the general formula (A) and said polyfunctional monomer having at least two unsaturated groups is at least 30 wt %,

(A)

wherein $R^3$ represents a substituent selected from the group consisting of hydrogen and $C_1$ to $C_{20}$ alkyl and alicyclic hydrocarbon groups, and $R^1$ and $R^2$ each independently represents a substituent selected from the group consisting of hydrogen, a methyl group and an ethyl group.

13. A plastic optical article according to claim 12 wherein said transparent coating comprises an organic polymer and particles of metal oxide having a diameter of 1 to 200 mμ.

14. A plastic optical article according to claim 13 wherein said organic polymer is a polymer obtained from a compound selected from the group consisting of an organosilicon compound represented by the following general formula (B) and its hydrolyzate:

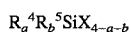

wherein $R^4$ is a $C_1$ to $C_{10}$ organic group, $R_5$ is a $C_1$ to $C_6$ hydrocarbon group or halogenated hydrocarbon group, X is a hydrolyzable group and a and b are 0 or 1.

15. A plastic optical article according to claim 13 wherein 1 to 80 wt % of said particles of metal oxide is contained in said transparent coating.

16. A plastic optical article according to claim 12, wherein said transparent coating consists of a silicone resin as the principal component.

17. A plastic optical article according to claim 12, wherein said article has a bending modulus at 170° C. from 20 to 300 kg/mm².

18. A plastic optical material according to claim 12, wherein said transparent cross-linked resin has a glass transition temperature of at least 160° C.

19. A plastic optical article according to claim 12, wherein said plastic optical article has at least one transparent electro-conductive layer.

* * * * *

UNITED STATES PATENT AND TRADEMARK OFFICE
CERTIFICATE OF CORRECTION

PATENT NO. : 5,514,466
DATED : May 7, 1996
INVENTOR(S) : Shinichi Yamada, Naoki Shimoyama, Takashi Taniguchi and Syunzi Kono It is certified that error appears in the above-indentified patent and that said Letters Patent is hereby corrected as shown below:

In Column 6, line 49, please change "$\delta$" to --$\gamma$--;
line 50, please change "$\delta$" to --$\gamma$--;
line 51, please change "$\delta$" to --$\gamma$--;
line 52, please change "$\delta$" to --$\gamma$--;
line 53, please change "$\delta$" to --$\gamma$--;
line 54, both occurrences, please change "$\delta$" to --$\gamma$--;
line 55, please change "$\delta$" to --$\gamma$--;
line 64, please change "$\delta$" to --$\gamma$--;
line 65, please change "$\delta$" to --$\gamma$--;
line 66, please change "$\delta$" to --$\gamma$--; and
line 67, both occurrences, please change "$\delta$" to --$\gamma$--.

In Column 7, line 1, please change "$\delta$" to --$\gamma$--;
line 2, please change "$\delta$" to --$\gamma$--;
line 3, both occurrences, please change "$\delta$" to --$\gamma$--;
line 4, please change "$\delta$" to --$\gamma$--;
line 5, please change "$\delta$" to --$\gamma$--; and
line 6, both occurrences, please change "$\delta$" to --$\gamma$--.

Signed and Sealed this

Thirteenth Day of August, 1996

Attest:

BRUCE LEHMAN

*Attesting Officer*     *Commissioner of Patents and Trademarks*